United States Patent
Lin

(10) Patent No.: US 6,530,308 B1
(45) Date of Patent: Mar. 11, 2003

(54) STEAM GRILL

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/153,542

(22) Filed: May 22, 2002

(51) Int. Cl.⁷ .................. A23L 1/00; A47J 27/04; A47J 37/06; A21B 1/36
(52) U.S. Cl. .................. 99/330; 99/345; 99/372; 99/375; 219/386; 219/401; 219/524
(58) Field of Search ................ 99/330, 345–347, 99/372–380, 422–425, 400, 401, 516, 416, 417; 219/385, 386, 401, 524; 126/20

(56) References Cited

U.S. PATENT DOCUMENTS

| | | | | |
|---|---|---|---|---|
| 1,380,656 A | * | 6/1921 | Lauth | ............... 99/330 |
| 5,931,083 A | * | 8/1999 | Stanger et al. | ........... 99/401 X |
| 5,943,949 A | * | 8/1999 | Sham et al. | ........... 99/422 |
| 6,310,326 B1 | * | 10/2001 | Wang | ........... 99/372 X |
| 6,380,524 B1 | * | 4/2002 | Keller | ........... 426/118 X |

* cited by examiner

Primary Examiner—Timothy F. Simone
(74) Attorney, Agent, or Firm—Alan Kamrath; Rider, Bennett, Egan & Arundel, LLP

(57) ABSTRACT

A steam grill includes a body, an upper lid, a water-storing member positioned on the upper lid, a heating section provided in the interior of the body, a dripping controller, and a grilling section under the heating section. The dripping controller is positioned within the water-storing member and controls the water volume dropping in the heating section. The heating section has a plurality of heating tubes for heating up water into steam to be supplied in the grilled section to moisten the food put on a grill plate therein to the proper degree so that the grilled food may have proper moisture and texture.

19 Claims, 3 Drawing Sheets

STEAM GRILL

BACKGROUND OF THE INVENTION

This invention relates to a steam grill, particularly to one supplying steam to different foods to be grilled positioned in a grilling section, and specifically to a steam grill where water is supplied via a dripping section into a heating section to be vaporized, with the water volume flowing into the heating section being controlled. The heating section heats up water to create steam to flow into a grilled section for moistening food to be grilled therein in various degrees according to different materials of food so as to grill foods to have proper resilience, moisture and texture.

A conventional steam grill generally has a grill plate placed on an inner bottom of a steam grill, a heating member positioned under the grill plate, and an upper lid pivotally connected to the grill housing. In the grilling process, the heating member electrically heats up food placed on the grill plate, but water in the food may be substantially evaporated out to cause the food to become very dry and have inferior texture.

SUMMARY OF THE INVENTION

This invention has been devised to offer a steam grill supplying steam for grilling food so as to let the grilled food have proper moisture, resilience and texture when eaten.

The feature of the invention is an upper lid provided with a recess for placing a water-storing member thereon and a transparent cover closing the water-storing member. The water-storing member and the transparent cover have a filling hole, and a dripping controller is provided in a chamber formed in the water-storing member. The dripping controller has a turning cap extending out of the transparent cover for manually turning to adjust water volume dropping down into the heating section. A shaft fits in a tubular portion of the turning cap and is always kept resiliently pushed downward.

A gap is formed between a hole in the bottom of the water-storing member and a lower tapered end of the shaft to allow water to flow down into the heating section for heating tubes to heat the water into steam. The steam flows down through holes in a bottom wall of the heating section to moisten food to be grilled. The gap can be adjusted by turning the turning cap to let different volumes of water flow through the gap into the heating section according to different foods to be grilled.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
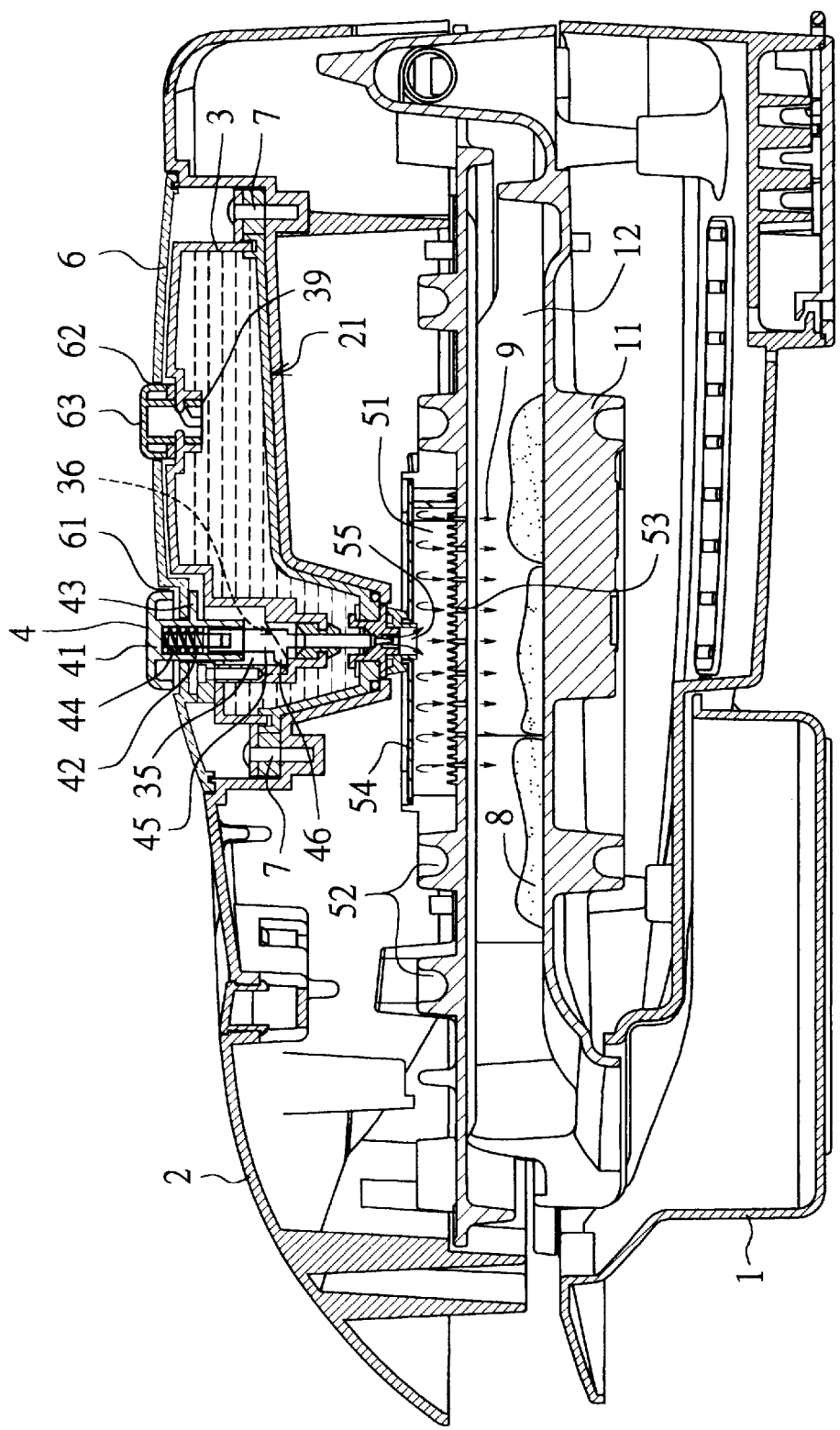
FIG. 1 is a side cross-sectional view of a steam grill in the present invention.
Figure 2:
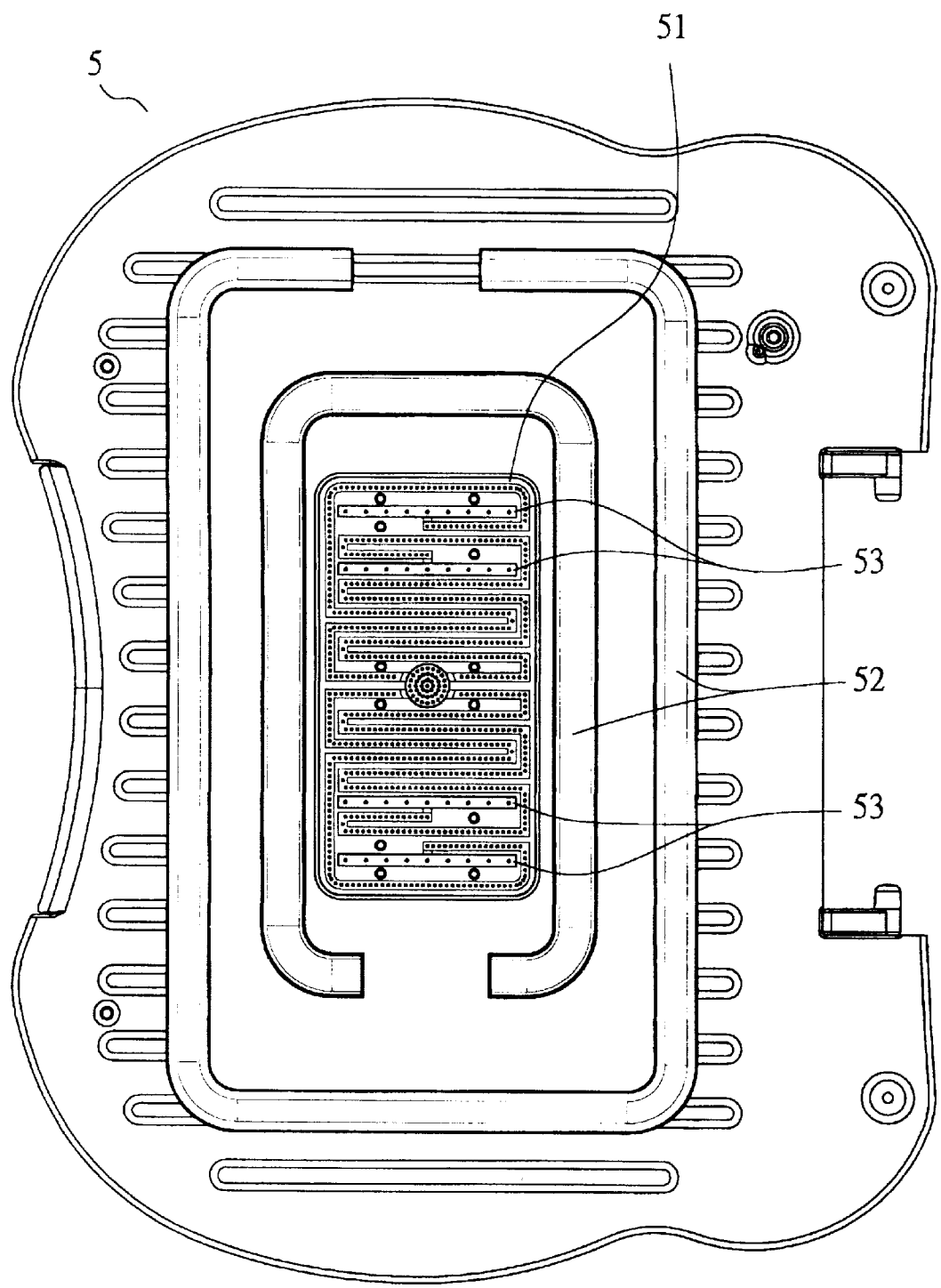
FIG. 2 is an upper view of a heating section on a bottom plate of an upper lid in the present invention; and, FIG. 3 is a magnified cross-sectional view of a water-storing member and a dripping section on the upper lid in the present invention.

A preferred embodiment of a steam grill in the present invention, as shown in FIG. 1, includes a housing 1, an upper lid 2 pivotally connected with one side of the housing 1, a grilling section 12, a water-storing member 3, a water controller 33, a dripping controller 4, a heating section 5, and a transparent cover 6 as the main components combined together.

The housing 1 has a hollow interior, and the grilling section 12 is formed in a lower portion thereof. A grill plate 11 is placed in the grilling section 12 for putting food to be grilled thereon. The heating section 5 positioned in an upper portion of the housing 1 on the grilling section 12.

The upper lid 2 has one end pivotally connected to one side of the housing 1 and is able to be opened or closed. The upper lid 2 has a recess 21 formed in an upper portion, a liquid exit section 22 of a cone shape formed under the recess 21, and a hole 23 bored in the bottom center of the liquid exit section 22.

Figure 3:
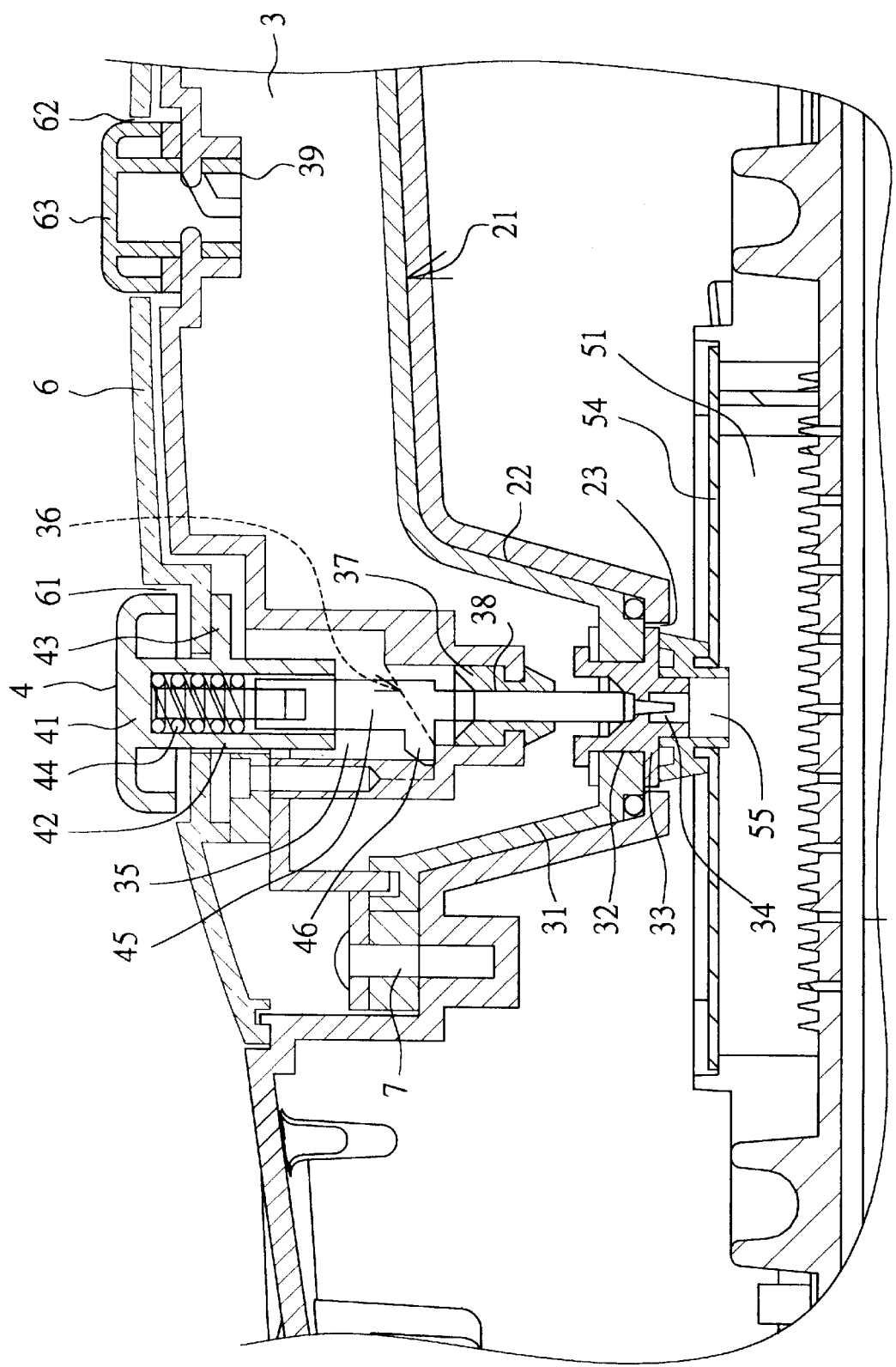

The water-storing member 3 is shaped to be positioned in the recess 21 and secured in place by fastening members 7. The water-storing member 3 is transparent As shown in FIG. 3, a dripping section 31 is formed in the liquid exit section 22 and has a hole 32 in the bottom center for the annular water controller 33 to fit therein. The water-storing member 3 further has a chamber 35 for an upper end of the dripping controller 4 to fit therein. The chamber 35 has an upper large diameter portion, a lower small diameter portion, and a sloped guide surface 36 at the abutting point of the upper and the lower portion above a hole 38 formed in a supporter 37. Further, the water-storing member 3 has a water inlet 39 provided in one side.

The dripping controller 4 is combined in the chamber 35 vertically and is made of a resilient material. The dripping controller 4 has a turning cap 41 in an upper portion, a tubular section 42 extending down from the turning cap 41, a projection 43 extending horizontally outward from the center of the tubular section 42, a shaft 45 fitting in and under the tubular section 42, and a coil spring 44 placed in the tubular section 42 and on an upper end of the shaft 45 to elastically push the shaft 45. Further, a projection 46 extends sideways from the shaft 45, with the projection 46 having a sloped end surface and a flat lower surface to contact and possibly to slide up and down the sloped guide surface 36 when the shaft 45 is turned. The shaft 45 has a tapered-down lower end movably fitting in the hole 34 of the annular water controller 33 so that a gap may be formed between the lower end of the shaft 45 and the hole 34 for adjusting the volume of water flowing therethrough and down into the heating section 5.

The turning cap 41 has a graduation printed on its upper surface to indicate water volume when the turning cap 41 is turned to various points of the graduation in accordance to the angle the shaft 45 is turned by the turning cap 41. When the steam grill is not used, the turning cap 41 stays normally at a 0 of the graduation to show no water to be dripped through the gap between the lower end of the shaft 45 and the hole 38 because of the gap being closed. If the turning cap 41 is turned to the largest number of the graduation, it shows the most water volume to be dripped through the gap between the lower end of the shaft 45, because the gap is the largest at that condition. There are many points of the graduation to indicate various water volume to be dripped through the gap, so a user may turn the turning cap 41 to the required point of the graduation for the desired water volume to be supplied to the heating section 5 in grilling food. As the turning cap 41 can be turned to one of many angles to a desired one of the many points of the graduation, the shaft 45 is turned the same angle and is moved up according to the distance of the projection 46 is raised by the sloped guide surface 36 on which the projection 46 rests on and slides up and down. Thus, the gap between the tapered lower end of the shaft 45 and the hole 38 may be made wider or narrower for various volumes of water to flow down into the heating section 5.

The transparent cover 6 is shaped to match the circumference of the recess 21 of the upper lid 2. The transparent cover 6 has a hole 61 for the tubular section 42 of the turning cap 41 to fit through and another hole 62 for a filling cap 63 to fit in and close the water inlet 39 of the water-storing member 3.

The heating section 5 has a recessed hollow space 51 under the dripping section 31 for water drops to fall therein and heating tubes 52 placed regularly around the recessed hollow space 51. Through holes 53 are bored down through the bottom wall of the heating section 5 for steam produced by water heated by the heating tubes 52 to flow downward into the grilling section 12. Further, a cover 54 is provided for closing the recessed hollow space 51 and has a center hole 55 for the water dripping through the gap between the lower end of the shaft 45 and the hole 34 down into the recessed hollow space 51.

In use, referring to FIG. 1 firstly, the upper lid 2 is opened, and food 8 to be grilled is placed on the grill plate 11 in the grilling section 12. Then, the upper lid 2 is closed on the housing 1. Then, the turning cap 41 of the dripping controller 4, which normally stays at the 0 point of the graduation in case the steam grill is not used, is turned to one of many points of the graduation, forcing the projection 46 of the shaft 45 to move up along the sloped guide surface 36 in a distance corresponding to the angle of the turning cap 41 is manually turned so that the gap between the lower portion of the shaft 45 and the hole 34 of the water controller 33 may be formed as wide as desired to adjust the dripping volume of water to suit the property of the food to be grilled. Then, the power switch is turned on to let the heating tubes 52 produce heat for producing steam for grilling the food 8 on the grill plate 11. The water dripping down in the recessed hollow space 51 of the heating section 5 may be gradually heated up to become vapor 9, which flows through the through holes 53 down into the grilling section 12, supplying the proper heat mixed with moisture to the being-grilled food 8. Therefore, the food finishing grilling may have proper resilience and texture for cating.

As understood by the above description, the steam grill in the invention has an advantage that steam to be supplied to the food to be grilled may be adjusted by handling the drip controller 4 in advance to keep the grilled food from becoming too dry but properly moistened for giving proper texture to eaters.

While the preferred embodiment of the invention has been described above, it will be recognized and understood that various modifications may be made therein and the appended claims are intended to cover all such modifications that may fall within the spirit and scope of the invention.

What is claimed is:

1. A steam grill comprising, in combination:
    a housing;
    an upper lid pivotally connected to the housing and moveable between open and closed positions, with the housing and the lid in the closed position defining an interior;
    a water-storing member having a water dripping section;
    a heating section in the interior and under the water dripping section;
    a grilling section positioned under the heating section and having a grill plate for putting food to be grilled thereon, wherein said heating section has a recessed hollow space corresponding to said water dripping section of said water-storing member and for receiving water failing down from said water dripping section, with the heating section further including heating tubes around said recessed hollow space, said recessed hollow space defined by a bottom plate, said bottom plate having a plurality of through holes spaced apart for steam to flow into said grilling section, and with the heating section further including an upper cover closing said recessed hollow space and having a center hole for receiving the water dripping section of said water-storing member.

2. The steam grill as claimed in claim 1 with the grilling section located in the housing and with the heating section located in the upper lid and pivotal relative to the grilling section.

3. The steam grill as claimed in claim 2 with the upper lid having a recess formed in an upper portion, with the water-storing member placed in the recess of the upper lid; with the steam grill further comprising, in combination: a cover enclosing the water-storing member in the recess of the upper lid.

4. A steam grill comprising, in combination:
    a housing;
    an upper lid pivotally connected to the housing and moveable between open and closed positions, with the housing and the lid in the closed position defining an interior;
    a water-storing member having a water release hole;
    a heating section in the interior and under the water release hole;
    a chamber formed in the water-storing member having a sloped guide surface; and
    a dripping controller contained in the chamber and having a manual turning cap, with a shaft extending from the manual turning cap and having an end movably fitting in the water release hole to form a gap between the water release hole and the shaft, with a projection extending from the shaft and moving up and down along the sloped guide surface as the manual turning cap is turned to adjust the gap and flow of water from the water-storing member to the heating section.

5. The steam grill as claimed in claim 4 with the sloped guide surface being at an abutting point of an upper larger diameter portion and a lower small diameter portion of the chamber, with the steam grill further comprising, in combination: a supporter provided under the chamber and having a hole for the shaft of the dripping controller to fit securely therein.

6. The steam grill as claimed in claim 5 with the manual turning cap including a tubular portion, with the shaft positioned in the tubular portion and pressed resiliently by a coil spring fitted in the tubular portion.

7. The steam grill as claimed in claim 6 further comprising, in combination: a grilling section having a grill plate for putting food to be grilled thereon, with the grilling section receiving steam from the heating section for moistening food on the grill plate.

8. The steam grill as claimed in claim 7 with the heating section having a plurality of heating tubes for heating water from the water-storing member into steam and a plurality of through holes through which steam can flow into the grilling section.

9. The steam grill as claimed in claim 8 with the upper lid having a recess formed in an upper portion, with the water-storing member placed in the recess of the upper lid, with the steam grill further comprising, in combination: a transparent cover enclosing the water-storing member in the recess of the upper lid; a water inlet in the water-storing member; and a filling cap closing the water inlet, with the manual turning cap having a set of graduations for indicating the water volume flowing through the gap.

10. The steam grill as claimed in claim 6 further comprising, in combination: a cover enclosing the water-storing member, with the tubular portion extending through a hole in the cover, with the tubular portion including a projection for abutting with the cover around the hole in the cover.

11. The steam grill as claimed in claim 4 with the manual turning cap including a tubular portion, with the shaft positioned in the tubular portion and pressed resiliently by a coil spring fitted in the tubular portion.

12. The steam grill as claimed in claim 11 further comprising, in combination: a cover enclosing the water-storing member, with the tubular portion extending through a hole in the cover, with the tubular portion including a projection for abutting with the cover around the hole in the cover.

13. The steam grill as claimed in claim 11 further comprising, in combination: a grilling section having a grill plate for putting food to be grilled thereon, with the grilling section receiving steam from the heating section for moistening food on the grill plate.

14. The steam grill as claimed in claim 13 with the beating section having a plurality of heating tubes for heating water from the water-storing member into steam and a plurality of through holes through which steam can flow into the grilling section.

15. The steam grill as claimed in claim 14 with the upper lid having a recess formed in an upper portion, with the water-storing member placed in the recess of the upper lid, with the cover enclosing the water-storing member in the recess of the upper lid, with the steam grill further comprising, in combination: a water inlet in the water-storing member; and a filling cap closing the water inlet, with the manual turning cap having a set of graduations for indicating the water volume flowing through the gap.

16. The steam grill as claimed in claim 4 further comprising, in combination: a grilling section having a grill plate for putting food to be grilled thereon, with the grilling section receiving steam from the heating section for moistening food on the grill plate.

17. The steal grill as claimed in claim 16 with the heating section having a plurality of heating tubes for heating water from the water-storing member into steam and a plurality of through holes through which steam can flow into the grilling section.

18. The steam grill as claimed in claim 17 with the upper lid having a recess formed in an upper portion, with the water-storing member placed in the recess of the upper lid, with the steam grill further comprising, in combination: a transparent cover enclosing the water-storing member in the recess of the upper lid; a water inlet in the water-storing member; and a filling cap closing the water inlet, with the manual turning cap having a set of graduations for indicating the water volume flowing through the gap.

19. The steam grill as claimed in claim 4 with the heating section having a plurality of heating tubes for heating water from the water-storing member into steam and a plurality of through holes through which steam can flow out of the heating section.

* * * * *